(12) United States Patent
Jiang

(10) Patent No.: US 11,010,964 B2
(45) Date of Patent: May 18, 2021

(54) METHOD AND DEVICE FOR GENERATING THREE-DIMENSIONAL GRAPHIC FILE AND PRESENTING THREE-DIMENSIONAL GRAPHIC ON CLIENT

(71) Applicant: Alibaba Group Holding Limited, Grand Cayman (KY)

(72) Inventor: Shanbin Jiang, Zhejiang (CN)

( * ) Notice: Subject to any disclaimer, the term of this patent is extended or adjusted under 35 U.S.C. 154(b) by 0 days.

(21) Appl. No.: 16/569,410

(22) Filed: Sep. 12, 2019

(65) Prior Publication Data

US 2020/0005531 A1    Jan. 2, 2020

Related U.S. Application Data

(63) Continuation of application No. PCT/CN2018/077984, filed on Mar. 5, 2018.

(30) Foreign Application Priority Data

Mar. 14, 2017   (CN) .......................... 201710149137.7

(51) Int. Cl.
*G06T 17/00* (2006.01)
*G06T 1/60* (2006.01)
*G06T 15/08* (2011.01)

(52) U.S. Cl.
CPC ................ *G06T 17/00* (2013.01); *G06T 1/60* (2013.01); *G06T 15/08* (2013.01); *G06T 2200/04* (2013.01)

(58) Field of Classification Search
None
See application file for complete search history.

(56) References Cited

U.S. PATENT DOCUMENTS 5,988,862 A    11/1999  Kacyra et al.
6,058,397 A *   5/2000  Barrus .................. G06Q 40/00
(Continued)

FOREIGN PATENT DOCUMENTS

CN    101369345 A    2/2009
CN    104778599 A    7/2015
(Continued)

OTHER PUBLICATIONS

Translation of International Search Report dated Jun. 5, 2018, from corresponding PCT Application No. PCT/CN2018/077984, 2 pages.
(Continued)

*Primary Examiner* — Jason A Pringle-Parker
(74) *Attorney, Agent, or Firm* — Lee & Hayes, P.C.

(57) ABSTRACT

A method for generating a three-dimensional graphic file including extracting, from data of a group of three-dimensional graph description objects including identical attribute features, data portions of the identical attribute features to form a shared description file shared by the group of three-dimensional graph description objects; extracting a data portion of a unique attribute feature of each three-dimensional graph description object in the group of three-dimensional graph description objects respectively to form a separate description file corresponding to each three-dimensional graph description object; and combining the shared description file with any of the separate description files according to requirements for displaying a three-dimensional graph to form a complete three-dimensional graph description file. The above method solves the problems in the conventional techniques that online shopping experience is affected as a three-dimensional graph presentation of different SKUs selected from the same kind of commodities cannot achieve an expected effect.

14 Claims, 8 Drawing Sheets

(56) References Cited

U.S. PATENT DOCUMENTS

| | | |
|---|---|---|
| 6,493,001 B1 | 12/2002 | Takagi et al. |
| 6,563,498 B1 | 5/2003 | Hirata et al. |
| 6,741,242 B1 | 5/2004 | Itoh et al. |
| 7,353,192 B1* | 4/2008 | Ellis .................. G06Q 20/3829 |
| | | 705/26.5 |
| 7,765,055 B2 | 7/2010 | Cera et al. |
| 7,769,806 B2 | 8/2010 | Van Wie et al. |
| 7,844,724 B2 | 11/2010 | Van Wie et al. |
| 8,566,714 B1* | 10/2013 | Stringer .................. G06T 19/20 |
| | | 715/273 |
| 8,766,997 B1* | 7/2014 | Hickman ................ G06T 17/00 |
| | | 345/581 |
| 9,536,344 B1* | 1/2017 | Baszucki .............. A63F 13/655 |
| 9,569,565 B2 | 2/2017 | Devito et al. |
| 2008/0001960 A1 | 1/2008 | Chen |
| 2009/0254843 A1 | 10/2009 | Van Wie et al. |
| 2009/0288007 A1 | 11/2009 | Leacock et al. |
| 2013/0218890 A1* | 8/2013 | Fernandes ............... G06F 16/27 |
| | | 707/736 |
| 2014/0035913 A1* | 2/2014 | Higgins ................. G06Q 30/00 |
| | | 345/420 |
| 2015/0351477 A1* | 12/2015 | Stahl ....................... G06F 30/00 |
| | | 700/132 |

FOREIGN PATENT DOCUMENTS

| | | |
|---|---|---|
| CN | 106357826 A | 1/2017 |
| WO | WO2012083502 A1 | 6/2012 |
| WO | WO2013075329 A1 | 5/2013 |

OTHER PUBLICATIONS

Translation of Written Opinion dated Jun. 5, 2018, from corresponding PCT Application No. PCT/CN2018/077984, 4 pages.

EP Search Report and Written Opinion dated Aug. 18, 2020 for European Patent Application No. 18767709.1, 11 pages.

KangYing, et. al., "Bitstream Specification for Repetitive Features Detection in 3D Mesh Coding", International Organisation for Standardisation, Jul. 2011, 11 pages.

* cited by examiner

EXTRACT, FROM DATA OF GROUP OF THREE-DIMENSIONAL GRAPH DESCRIPTION OBJECTS WITH IDENTICAL ATTRIBUTE FEATURES, DATA PORTIONS OF IDENTICAL ATTRIBUTE FEATURES TO FORM SHARED DESCRIPTION FILE; AND EXTRACT DATA PORTIONS OF UNIQUE ATTRIBUTE FEATURE OF EACH THREE-DIMENSIONAL GRAPH DESCRIPTION OBJECT IN GROUP OF THREE-DIMENSIONAL GRAPH DESCRIPTION OBJECTS RESPECTIVELY TO FORM SEPARATE DESCRIPTION FILE

S102

COMBINE SHARED DESCRIPTION FILE WITH ANY OF SEPARATE DESCRIPTION FILES ACCORDING TO REQUIREMENTS FOR DISPLAYING THREE-DIMENSIONAL GRAPH TO FORM COMPLETE THREE-DIMENSIONAL GRAPH DESCRIPTION FILE

EXTRACT DATA PORTIONS OF UNIQUE ATTRIBUTE FEATURE OF PARTICULAR THREE-DIMENSIONAL GRAPH DESCRIPTION OBJECT IN GROUP OF THREE-DIMENSIONAL GRAPH DESCRIPTION OBJECTS, WHEREIN UNIQUE ATTRIBUTE FEATURE INCLUDES ONE OR MORE ATTRIBUTE FEATURES
S302

PLACE DATA PORTIONS OF UNIQUE ATTRIBUTE FEATURE OF PARTICULAR THREE-DIMENSIONAL GRAPH DESCRIPTION OBJECT ACCORDING TO DIFFERENT ATTRIBUTES INTO DATA BLOCKS CORRESPONDING TO RESPECTIVE ATTRIBUTES
S304

COMBINE DATA BLOCKS WITH OTHER RELATED DATA ACCORDING TO SPECIFIED FORMAT TO FORM EXCLUSIVE DATA BLOCK SET
S306

FILE EXCLUSIVE DATA BLOCK SET TO FORM SEPARATE DESCRIPTION FILE
S308

FIG. 3

```
┌─────────────────────────────────────────────────────────────────┐
│ DOWNLOAD SHARED DESCRIPTION FILE OF GROUP OF THREE-DIMENSIONAL  │
│ GRAPH DESCRIPTION OBJECTS WITH IDENTICAL ATTRIBUTE FEATURES, AND│
│   DOWNLOAD AT LEAST ONE SEPARATE DESCRIPTION FILE OF GROUP OF   │
│          THREE-DIMENSIONAL GRAPH DESCRIPTION OBJECTS            │
│                              S602                               │
└─────────────────────────────────────────────────────────────────┘
                                 │
                                 ▼
┌─────────────────────────────────────────────────────────────────┐
│   COMBINE SHARED DESCRIPTION FILE WITH SEPARATE DESCRIPTION     │
│   FILE TO FORM COMPLETE THREE-DIMENSIONAL GRAPH DESCRIPTION FILE│
│                              S604                               │
└─────────────────────────────────────────────────────────────────┘
                                 │
                                 ▼
┌─────────────────────────────────────────────────────────────────┐
│       AUTOMATICALLY PRESENT THREE-DIMENSIONAL GRAPH BY USING    │
│         COMBINED THREE-DIMENSIONAL GRAPH DESCRIPTION FILE       │
│                              S606                               │
└─────────────────────────────────────────────────────────────────┘
                                 │
                                 ▼
┌─────────────────────────────────────────────────────────────────┐
│  FURTHER DOWNLOAD ANOTHER SEPARATE DESCRIPTION FILE BELONGING   │
│     TO GROUP OF THREE-DIMENSIONAL GRAPH DESCRIPTION OBJECTS     │
│  ACCORDING TO PRESENTATION REQUIREMENTS, AND RETURN TO STEP OF  │
│  COMBINING SHARED DESCRIPTION FILE WITH SEPARATE DESCRIPTION    │
│ FILE TO FORM COMPLETE THREE-DIMENSIONAL GRAPH DESCRIPTION FILE, │
│       UNTIL THREE-DIMENSIONAL GRAPH PRESENTATION IS EXITED      │
│                              S608                               │
└─────────────────────────────────────────────────────────────────┘
```

FIG. 6

METHOD AND DEVICE FOR GENERATING THREE-DIMENSIONAL GRAPHIC FILE AND PRESENTING THREE-DIMENSIONAL GRAPHIC ON CLIENT

CROSS REFERENCE TO RELATED PATENT APPLICATIONS

This application claims priority to and is a continuation of PCT Patent Application No. PCT/CN2018/077984, filed on 5 Mar. 2018 and entitled "METHOD AND DEVICE FOR GENERATING THREE-DIMENSIONAL GRAPHIC FILE AND PRESENTING THREE-DIMENSIONAL GRAPHIC ON CLIENT," which claims priority to Chinese Patent Application No. 201710149137.7, filed on 14 Mar. 2017 and entitled "METHOD AND DEVICE FOR GENERATING THREE-DIMENSIONAL GRAPHIC FILE AND PRESENTING THREE-DIMENSIONAL GRAPHIC ON CLIENT," which are incorporated herein by reference in their entirety.

TECHNICAL FIELD

The present disclosure relates to the technical field of three-dimensional graphs, and, more particularly, to methods and devices for generating a three-dimensional graphic file. The present disclosure also relates to methods and devices for presenting a three-dimensional graph at a client terminal.

BACKGROUND

Three-dimensional graphics technologies have been developed along with the gaming industry. In order to meet the needs of game scenes, various types of data, algorithms, special effects, and renderings have emerged. There are dozens of different formats for three-dimensional data exchange in different engines or production tools.

Recently, with the development of e-commerce, online shopping customers have become more and more demanding with respect to fully understanding products to be purchased. It has become a common requirement to use three-dimensional graphics technology to present commodities more intuitively to the online shopping customers. For example, boots of a certain style belonging to a Standard Product Unit (SPU) have identical exterior structures. However, under this SPU, there are also different stock keeping units (SKUs) formed due to various specifications, colors, and materials belonging to the same SPU. When a user selects a certain style of boots, three-dimensional graphics of the style of boots need to be presented for the user. During the presentation, three-dimensional graphics of boots of different specifications, different materials, different textures, and different colors need to be presented, so that the user may choose his/her favorite style. It should be understood that commodities belonging to the same SPU are the same kind of commodities, and the same kind of commodities have different styles. For example, for iPhone 6s Plus mobile phones, there may be different colors; an iPhone 6s Plus is an SPU, and different colors of iPhone 6s Plus mobile phones are different SKUs. Certainly, for an e-commerce platform, the SKUs may also include different SKUs caused by the types of package, merchants, etc. Only the factors related to presentation of the three-dimensional graphics are considered here. The present disclosure is mainly directed to the presentation problem of three-dimensional graphics of different styles of the same kind of commodities.

In the conventional techniques, a conventional data exchange format of three-dimensional graphics mainly aims to meet the needs of industrial design; and its data storage manner mainly aims to the convenience of the design process. Therefore, the data storage focuses more on how to facilitate the design. For example, usually in model data, in addition to placing relevant data of the geometric structure, some rendering data closely related to the three-dimensional structure is also placed. The three-dimensional graphic data structure in the conventional techniques may better meet the requirements of the three-dimensional graphic design. However, apparent defects exist in the above-mentioned scenario in which the e-commerce presents three-dimensional graphics at a client terminal, that is, in the case of presenting different styles of the same kind of commodities.

Firstly, when the client terminal downloads the three-dimensional graphics for automatic three-dimensional presentation, for the same kind of commodities, when selection needs to be made in color, material, and the like, due to a large amount of data to be downloaded and long downloading time, the user cannot quickly browse, thus affecting the online shopping experience.

Secondly, when the client terminal automatically presents three-dimensional graphics of the same kind of commodities and chooses to automatically present commodities of different SKUs due to different styles, different colors, different materials or different textures of this kind of commodities, a function of automatic three-dimensional dynamic presentation of different SKUs of the same kind of commodities is provided. However, under the current three-dimensional graphics technology, when the exterior surface of a presented commodity changes during the three-dimensional presentation, lags always occurs and seamless switching cannot be performed smoothly. Therefore, the three-dimensional graphics presentation method as previously conceived for helping a user select among different SKUs of the same kind of commodity cannot achieve an expected effect.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

A method for generating a three-dimensional graph is provided in the present disclosure to solve the problems in the conventional techniques that online shopping experience is affected as a three-dimensional graph presentation method for selecting among different SKUs of the same kind of commodities cannot achieve an expected effect.

The method for generating a three-dimensional graphic file includes:

extracting, from data of a group of three-dimensional graph description objects including identical attribute features, data portions of the identical attribute features to form a shared description file shared by the group of three-dimensional graph description objects; and extracting a data portion of a unique attribute feature of each three-dimensional graph description object in the group of three-dimensional graph description objects respectively to form a separate description file corresponding to each three-dimensional graph description object; and combining the shared description file with any of the separate description files according to requirements for displaying a three-dimensional graph to form a complete three-dimensional graph description file, wherein the three-dimensional graph description file is used to generate the three-dimensional graph.

For example, in the step of extracting, from data of a group of three-dimensional graph description objects including identical attribute features, data portions of the identical attribute features to form a shared description file shared by the group of three-dimensional graph description objects, the identical attribute features are geometric features of the three-dimensional graph description objects.

For example, the extracting, from data of a group of three-dimensional graph description objects including identical attribute features, data portions of the identical attribute features to form a shared description file shared by the group of three-dimensional graph description objects includes:

extracting, from data of a group of three-dimensional graph description objects including identical attribute features, data portions of the identical attribute features;

placing the data of identical attribute features according to their attributes into one or more data blocks corresponding to the attributes;

combining the one or more data blocks corresponding to the attributes with other related data according to a preset format to form a common data block set; and processing the common data block set to form the shared description file.

For example, the extracting a data portion of a unique attribute feature of each three-dimensional graph description object in the group of three-dimensional graph description objects respectively to form a separate description file corresponding to each three-dimensional graph description includes:

extracting a data portion of a unique attribute feature of a particular three-dimensional graph description object in the group of three-dimensional graph description objects, wherein the unique attribute feature includes one or more attribute features;

placing the data portion of the unique attribute feature of the particular three-dimensional graph description object according to different attributes into data blocks corresponding to respective attributes;

combining the data blocks with other related data according to a preset format to form a unique data block set; and processing the unique data block set to form the separate description file.

For example, the other related data includes:
header information, version information, and a data block index.

For example, the processing includes:
compressing data in the common data block set or unique data block set.

For example, after processing the common data block set or processing the unique data block set and before forming the shared description file or forming the separate description file, the method includes:

encrypting and/or compressing intermediate files after the processing.

For example, when the group of three-dimensional graph description objects including identical attribute features has identical material data, the identical attribute features include materials of the three-dimensional graph description objects.

For example, the unique attribute features of the three-dimensional graph description objects include:
color, material, and texture.

A device for generating a three-dimensional graphic file is further provided in the present disclosure, including:

a shared data extracting unit configured to extract, from data of a group of three-dimensional graph description objects including identical attribute features, data portions of the identical attribute features to form a shared description file shared by the group of three-dimensional graph description objects;

a separate data extracting unit configured to extract a data portion of a unique attribute feature of each three-dimensional graph description object in the group of three-dimensional graph description objects respectively to form a separate description file corresponding to each three-dimensional graph description; and a complete file forming unit configured to combine the shared description file with any of the separate description files according to requirements for displaying a three-dimensional graph to form a complete three-dimensional graph description file, wherein the three-dimensional graph description file may be configured to generate the three-dimensional graph.

A method for presenting a three-dimensional graph at a client terminal is also provided in the present disclosure, comprising:

downloading a shared description file of a group of three-dimensional graph description objects including identical attribute features, and downloading at least one separate description file of the group of three-dimensional graph description objects, wherein the shared description file and the separate description file are obtained by: extracting, from data of a group of three-dimensional graph description objects including identical attribute features, data portions of the identical attribute features to form a shared description file shared by the group of three-dimensional graph description objects; and extracting a data portion of a unique attribute feature of each three-dimensional graph description object in the group of three-dimensional graph description objects respectively to form a separate description file corresponding to each three-dimensional graph description object;

combining the shared description file with the separate description file to form a complete three-dimensional graph description file;

automatically presenting the three-dimensional graph by using the combined three-dimensional graph description file; and further downloading other separate description files belonging to the group of three-dimensional graph description objects according to presentation requirements, and returning to the step of combining the shared description file with the separate description file to form a complete three-dimensional graph description file until the three-dimensional graph presentation is exited.

For example, the group of three-dimensional graph description objects including identical attribute features includes a group of different SKU presentation commodities belonging to the same SPU.

For example, the identical attribute features include:
geometric features of the different SKU presentation commodities.

For example, the unique attribute features include:
color, material, and texture of each SKU presentation commodity in the different SKU presentation commodities.

For example, according to a commodity browsing record of the client terminal, a shared description file of an SPU presentation commodity frequently accessed by the client terminal is downloaded and stored in the client terminal locally; when the client terminal needs to present the presentation commodity belonging to the SPU subsequently, the shared description file of the SPU commodity stored in the client terminal locally is directly combined with a separate description file of a specific SKU presentation commodity of the downloaded SPU to form the complete three-dimensional graph description file.

A device for presenting a three-dimensional graph at a client terminal is further provided in the present disclosure, comprising:

a data downloading unit configured to download a shared description file of a group of three-dimensional graph description objects including identical attribute features, and download at least one separate description file of the group of three-dimensional graph description objects, wherein the shared description file and the separate description file are obtained by: extracting, from data of a group of three-dimensional graph description objects including identical attribute features, data portions of the identical attribute features to form a shared description file shared by the group of three-dimensional graph description objects; and extracting a data portion of a unique attribute feature of each three-dimensional graph description object in the group of three-dimensional graph description objects respectively to form a separate description file corresponding to each three-dimensional graph description object;

a file forming unit configured to combine the shared description file with the separate description file to form a complete three-dimensional graph description file; and a graph presenting unit configured to automatically present the three-dimensional graph by using the combined three-dimensional graph description file.

Compared with the conventional techniques, the present disclosure has the following advantages:

A method for generating a three-dimensional graph is provided in the present disclosure, comprising: extracting, from data of a group of three-dimensional graph description objects including identical attribute features, data portions of the identical attribute features to form a shared description file shared by the group of three-dimensional graph description objects; extracting a data portion of a unique attribute feature of each three-dimensional graph description object in the group of three-dimensional graph description objects respectively to form a separate description file corresponding to each three-dimensional graph description object; and combining the shared description file with any of the separate description files according to requirements for generating the three-dimensional graph for presentation to form a complete three-dimensional graph description file, wherein the three-dimensional graph description file is used to generate the three-dimensional graph.

In the method of generating a three-dimensional graph provided in the present disclosure, by extracting the data of identical attribute features and forming a shared description file shared by the group of three-dimensional graph description objects, and extracting a data portion of a unique attribute feature of each three-dimensional graph description object in the group of three-dimensional graph description objects respectively to form a separate description file corresponding to each three-dimensional graph description object, the shared data shared by the three-dimensional graph description objects and specific unique data may be stored separately. When different three-dimensional graph description objects in the same group need to be presented, the shared data shared by the three-dimensional graph description objects only needs to be obtained once, and the shared data is then used repeatedly. For different three-dimensional graph description objects in the same group, the unique description data required for rendering only needs to be obtained separately each time, and then the shared data is combined with different unique description data to construct complete three-dimensional description data. According to this solution, it is unnecessary to acquire complete three-dimensional description data of the three-dimensional graph description object each time, thus reducing redundant data access consumption and saving traffic of a user.

BRIEF DESCRIPTION OF THE DRAWINGS

In order to illustrate the technical solutions in the example embodiments of the present disclosure more clearly, the following briefly describes the accompanying drawings which aid in describing the example embodiments. Apparently, the accompanying drawings in the following description merely show some of the example embodiments of the present disclosure, and persons of ordinary skill in the art may derive other drawings from these accompanying drawings without creative efforts.

FIG. 1 is a flowchart of a method for generating a three-dimensional graphic file according to a first example embodiment of the present disclosure.

FIG. 3 is a flowchart of extracting a data portion of a unique attribute feature of each three-dimensional graph description object in the group of three-dimensional graph description objects respectively to form a separate description file corresponding to each three-dimensional graph description according to the first example embodiment of the present disclosure.

FIG. 6 is a flowchart of a method for presenting a three-dimensional graph at a client terminal according to a second example embodiment of the present disclosure.

DETAILED DESCRIPTION

Figure 2:
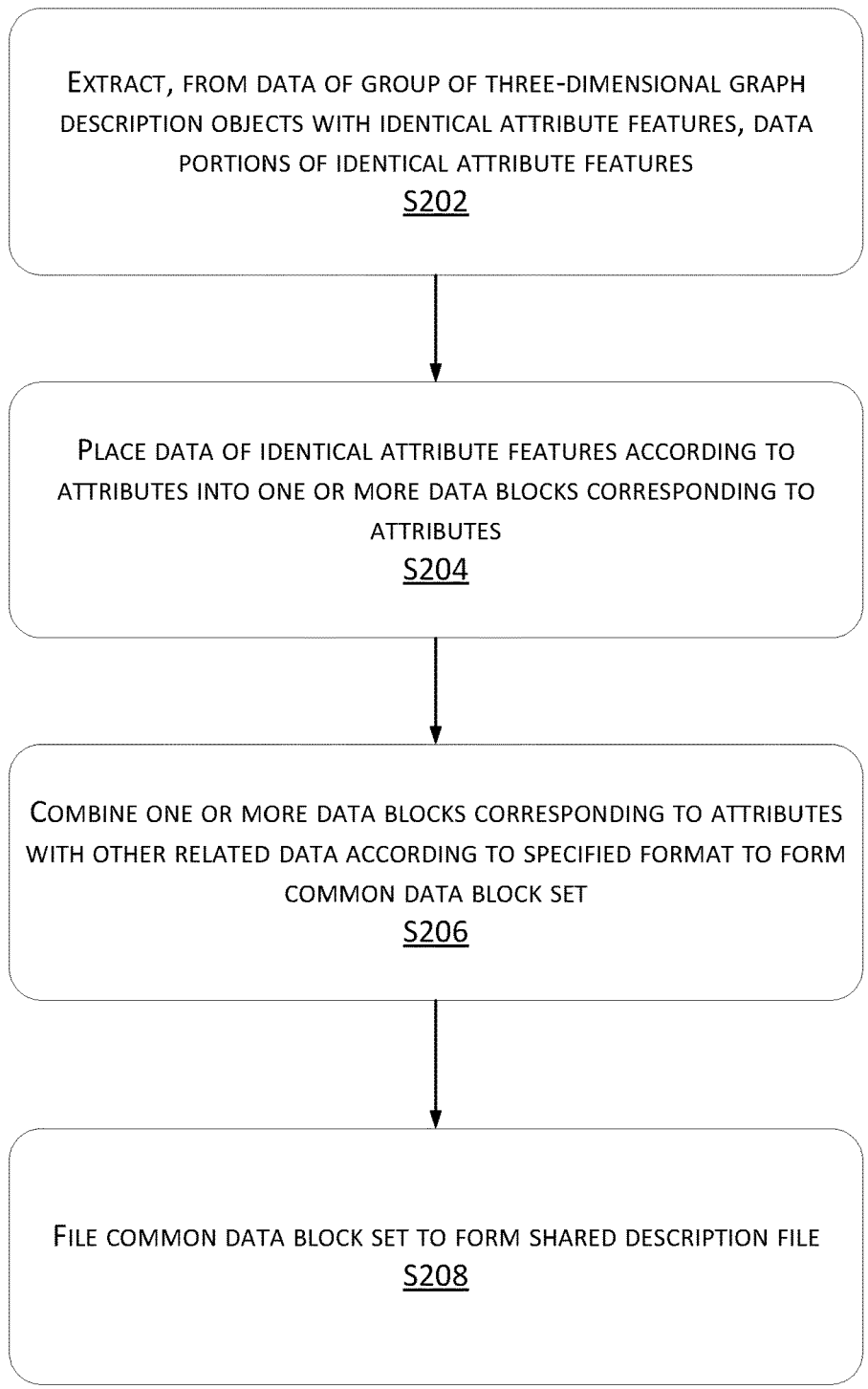
FIG. 2 is a flowchart of extracting, from data of a group of three-dimensional graph description objects including identical attribute features, data portions of the identical attribute features to form a shared description file shared by the group of three-dimensional graph description objects according to the first example embodiment of the present disclosure.

Many details are described in the following description to facilitate full understanding of the present disclosure. However, the present disclosure may be implemented in many other manners different from those described here. Those skilled in the art may make similar developments without departing from the spirit of the present disclosure. Therefore, the present disclosure is not limited to specific implementations disclosed in the following.

A method for generating a three-dimensional graphic file is provided in a first example embodiment of the present disclosure. Referring to FIG. 1, a flowchart of a method for generating a three-dimensional graphic file according to an example embodiment of the present disclosure is shown. Detailed description is made in the following with reference to FIG. 1.

In step S102, data portions of identical attribute features are extracted from data of a group of three-dimensional graph description objects including the identical attribute features to form a shared description file shared by the group of three-dimensional graph description objects; and a data portion of a unique attribute feature of each three-dimensional graph description object in the group of three-dimensional graph description objects is extracted respectively to form a separate description file corresponding to each three-dimensional graph description object.

The three-dimensional graph description object refers to a three-dimensional object that needs to be described through three-dimensional graphic data. For example, when a female bag or a shoe is presented three-dimensionally on a screen, the female bag or the shoe is the three-dimensional graph description object.

The attribute feature here specifically refer to a feature in a certain aspect extracted for the three-dimensional graph description object in the process of three-dimensional description of the three-dimensional graph description object, such as a geometric attribute feature, a color attribute feature, a material attribute feature, a texture attribute feature, and the like of the three-dimensional graph description object.

In the present disclosure, the identical attribute feature refers to that a group of similar three-dimensional graph description objects have identical feature data in a certain attribute, and such attribute feature is referred to as an identical attribute feature of this group of three-dimensional graph description objects. Commodities of the same kind but of different SKUs as conceived in this example embodiment are a group of three-dimensional graph description objects having an identical attribute feature. Specifically, the identical attribute feature generally includes a geometric feature of the three-dimensional graph description object, i.e., a shape scale of the three-dimensional graph description object. Sometimes, when materials of a group of three-dimensional graph description objects are identical, the material may also be used as an identical attribute feature. For example, one type of female bags is in the same shape and made of cow leather, and in this case, the identical attribute feature includes a geometric feature and a material feature.

In the present disclosure, the unique attribute feature refers to that a group of similar three-dimensional graph description objects have no identical feature data in a certain attribute, which generally includes features such as color, material, and texture of the three-dimensional graph description objects. The texture feature here includes a smooth surface, a furry surface, and the like.

In the present disclosure, the group of three-dimensional graph description objects including identical attribute features refers to two or more three-dimensional graph description objects having at least one identical attribute feature. For example, female bags in five colors with the same shape and size may be referred to as a group of three-dimensional graph description objects including identical attribute features.

In this step, the data portions of identical attribute features and the data portions of unique attribute features of the three-dimensional graph description objects are extracted respectively to form the shared description file and the separate description file respectively, thereby realizing separation of the shared data describing identical attribute features from unique data describing unique attribute features.

For example, for a type of female bags in three colors, namely, red, yellow, and blue, materials and geometric features thereof are the same. Then, through step S102, three-dimensional data corresponding to the female bags in the three colors forms a shared description file including data of the shape, size, and material; and separate description files including a red separate description file, a yellow separate description file, and a blue separate description file.

In an example solution, the extracting, from data of a group of three-dimensional graph description objects including identical attribute features, data portions of the identical attribute features to form a shared description file shared by the group of three-dimensional graph description objects includes:

extracting, from data of a group of three-dimensional graph description objects including identical attribute features, data portions of the identical attribute features;

placing the data of identical attribute features according to attributes into one or more data blocks corresponding to the attributes;

combining the one or more data blocks corresponding to the attributes with other related data according to a preset format to form a common data block set; and processing the common data block set to form the shared description file.

Referring to FIG. 2, a flowchart of extracting, from data of a group of three-dimensional graph description objects including identical attribute features, data portions of the identical attribute features to form a shared description file shared by the group of three-dimensional graph description objects according to the first example embodiment of the present disclosure is shown, specifically including steps S202 to S208. This will be described below with reference to FIG. 4 and FIG. 5.

Figure 4:
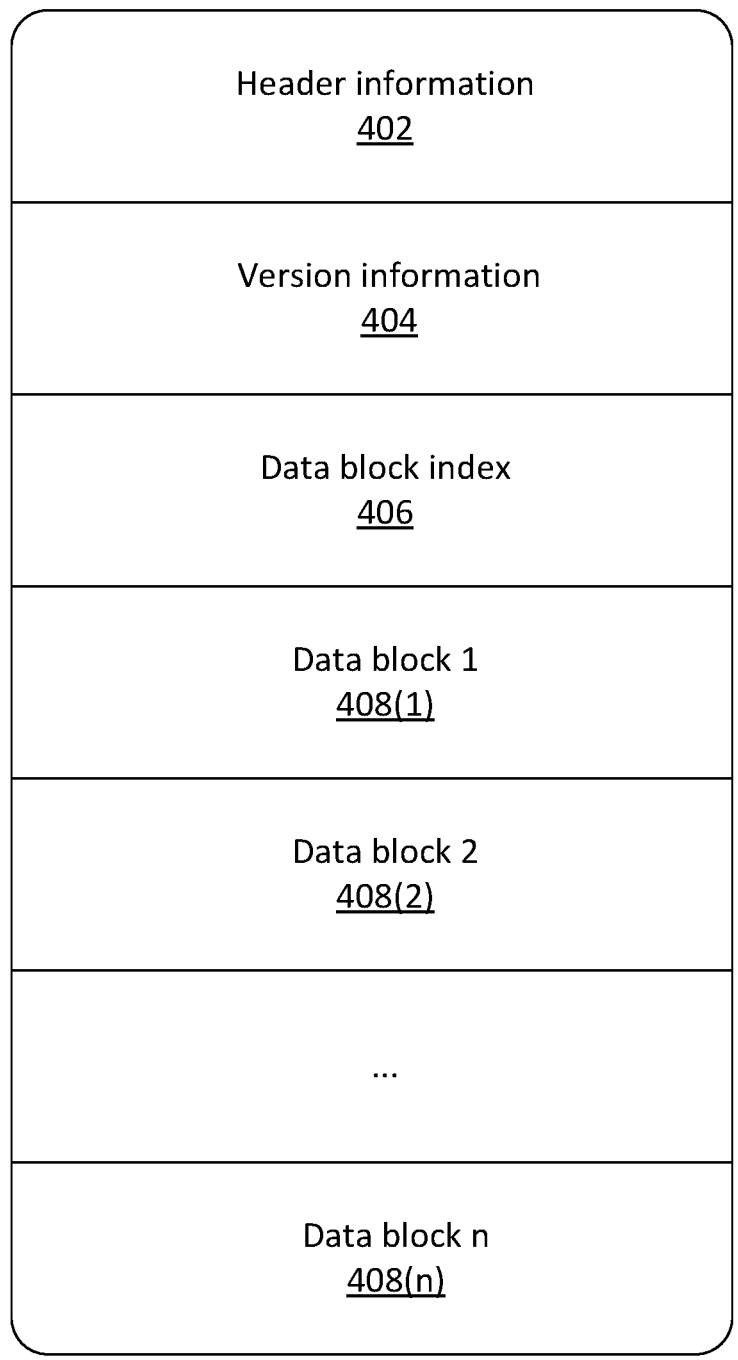
FIG. 4 is a schematic diagram of a bundle format according to the first example embodiment of the present disclosure.

In order to better organize the data blocks, in this example embodiment, a set of the attribute feature data block and the related management parameter data blocks is set as a data block set, which is also referred to as a bundle. The bundle may include module bundle, rendering bundle, and extension bundle. The bundle constitutes components of the commodity for presentation. The data of identical attribute features is placed into various data blocks for respective attributes. Format information of the specific data block set is shown in FIG. 4. Header information 402 is used for bundle validation; version information 404 is used for bundle version control or upgrade; and a data block index 406 is used for describing information and access addresses of data blocks such as data block 1 408(1), data block 2 408(2), . . . , data block n 408(n) in the bundle, where n may be any integer.

As the bundle stores the information is data blocks, the data blocks may be freely split or combined into a new bundle. The information in the newly created separate bundle is parsed to be used for a specified model. For example, if the material or texture information is shared, the material or texture data may be packed into a separate bundle. The data of SKU for each commodity may be composed of multiple bundles.

For example, the identical attribute features are geometric features, and the following steps are introduced below.

In step S202, data portions of identical attribute features are extracted from data of a group of three-dimensional graph description objects including the identical attribute features.

The data portions of identical attribute features are extracted in this step.

If identical attribute features are geometric features, the extracting, from data of a group of three-dimensional graph description objects including identical attribute features, data portions of the identical attribute features may refer to extracting model data portions describing geometric shapes from data of a group of three-dimensional graph description objects with identical geometric shapes. For example, a group of three-dimensional graph description objects is a type of female bags in three colors, and the extracting, from data of a group of three-dimensional graph description objects including identical attribute features, data portions of the identical attribute features may refer to extracting model data portions describing geometric shapes of the female bags from three-dimensional data describing the female bags in different colors.

In step S204, the data of identical attribute features is placed according to attributes into one or more data blocks corresponding to the attributes.

Figure 5:
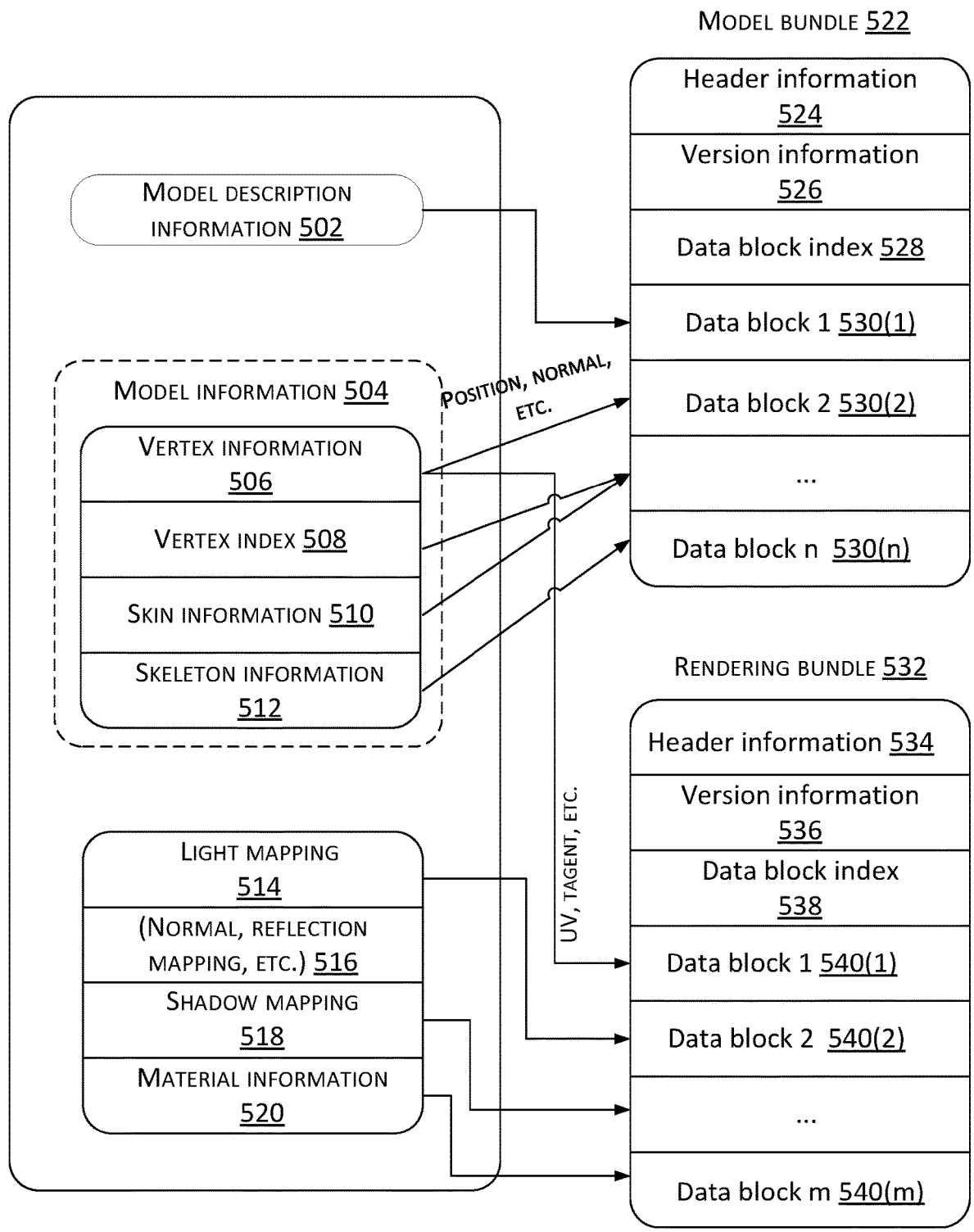
FIG. 5 is a schematic diagram of forming a common data block set and a unique data block set according to the first example embodiment of the present disclosure.

As shown in FIG. 5, the original data information of a three-dimensional graph description object includes model description information 502 and model information 504. The model information 504 includes vertex information 506, vertex index 508, skin information 510, and skeleton information 510 that build the model of the object. The original data information of a three-dimensional graph description object may further include other rending information such as light mapping 514, normal or reflection mapping 516, shadow mapping 518, and material information 520.

The original data information of the three-dimensional graph description object is parsed and placed into different data blocks in different bundles according to their corresponding attributes. Such different bundles include a model bundle 522 that includes header information 524, version information 526, data black index 528, and access addresses of data blocks such as data block 1 530(1), data block 2 530(2), . . . , data block n 530(n) in the bundle, where n may be any integer. The model bundle 522 may be used to place the data of the identical attribute features. Such different modules may also include a rendering bundle 532 that includes header information 534, version information 536, data black index 538, and access addresses of data blocks such as data block 1 540(1), data block 2 540(2), . . . , data block m 540(m) in the bundle, where m may be any integer. The rendering bundle 532 may be used to place the data of the unique attribute features.

Data information in the original data information of the three-dimensional graph description object may be further split to different bundles depending on whether it is identical attribute feature or unique attribute feature. For example, some unique attribute features such as UV, tangent, etc. from the vertex information 506 are placed in the data block 1 540(1) of the rendering bundle 532; while some identical attribute feature such as position, normal, etc. from the vertex information 506 are placed in the data block 2 530(2) of the model bundle 522.

As shown in FIG. 5, the model description information 502 is placed in a data block 1 530(1) set for the model description information 502. Vertex information 506, vertex index 508, skin information 510, skeleton information 512, and the like are also respectively placed in corresponding data blocks in the model bundle 522. These pieces of information belong to geometric feature data of a three-dimensional graphic description image, and are sub-attribute features under the geometric feature data. By division into different data blocks, different types of geometric feature data are managed respectively, and therefore, data management and data update may be better performed.

In step S206, the one or more data blocks corresponding to the attributes are combined with other related data according to a preset format to form a common data block set.

The other related data includes: header information, version information, and a data block index.

In this example embodiment, the combining the one or more data blocks corresponding to the attributes with other related data according to a preset format to form a common data block set specifically refers to combining the data blocks corresponding to the geometric features with the header information, the version information, and the data block index to form a model data block set, which is also referred to as a model bundle.

Since it is not convenient to store the common data block set, the common data block set, needs to be packaged and compressed into a file for storage.

In step S208, the common data block set is processed to form the shared description file.

The compressing the common data block set generally refers to reducing data packaging precision according to design when the model or texture data in the common data block set is serialized. For example, information such as a vertex normal adopts 32-bit float or 16-bit float, the texture adopts RGBA or RGB565, and a vertex index adopts index16 or index32. The so-called serializing data refers to writing data to a storage area in a certain order and format; in short, generating a storage file in a required format from original data. If a data type or a color mode that occupies a small data space is used, the size of the serialized data may be significantly reduced, up to about 50%.

After the common data block set is processed or the unique data block set is processed, and before the shared description file is formed or the separate description file is formed, in order to ensure security of data in the file, intermediate files after the processing are encrypted. In order to reduce the storage space occupied by the separate description files, the intermediate files after the processing may also be compressed. The compressing here refers to file compression, and the serialized data is compressed using a public algorithm, such as ZIP.

In a solution, the extracting a data portion of a unique attribute feature of each three-dimensional graph description object in the group of three-dimensional graph description objects respectively to form a separate description file corresponding to each three-dimensional graph description object includes:

extracting a data portion of a unique attribute feature of a particular three-dimensional graph description object in the group of three-dimensional graph description objects, wherein the unique attribute feature includes one or more attribute features;

placing the data portion of the unique attribute feature of the particular three-dimensional graph description object according to different attributes into data blocks corresponding to respective attributes;

combining the data blocks with other related data according to a preset format to form a unique data block set; and processing the unique data block set to form the separate description file.

Referring to FIG. 3, a flowchart of extracting a data portion of a unique attribute feature of each three-dimensional graph description object in the group of three-dimensional graph description objects respectively to form a separate description file corresponding to each three-dimensional graph description according to the first example embodiment of the present disclosure is shown, specifically including steps S302 to S306. This will be described below with reference to FIG. 4 and FIG. 5.

In step S302, a data portion of a unique attribute feature of a particular three-dimensional graph description object in the group of three-dimensional graph description objects is extracted, wherein the unique attribute feature includes one or more attribute features.

The data portion of the unique attribute feature is extracted in this step.

The number of attribute features included in the unique attribute feature is indeterminate and varies according to the different three-dimensional graph description objects. If the three-dimensional graph description objects only have identical geometric features, and their materials, colors, and textures are different, the unique attribute features include material features, color features, and texture features. If both the geometric features and materials of the three-dimensional graph description objects are the same, the unique attributes feature includes material features, color features, and texture features.

If the unique attribute features include material, color and texture, the extracting a data portion of a unique attribute feature of a particular three-dimensional graph description object in the group of three-dimensional graph description objects may refer to extracting data portions describing the material, color, and texture of the object from data of a certain three-dimensional graph description object in this group. For example, the three-dimensional graph description object is a type of female bags, their material includes cow leather and sheepskin, their color includes red, yellow, and blue, and their texture includes smooth and furry. If a female bag is a red smooth cow-leather female bag, the extracted data portion of a unique attribute feature of the female bag includes data of color, texture, and material.

In step S304, the data portion of the unique attribute feature of the particular three-dimensional graph description object is placed according to different attributes into data blocks corresponding to respective attributes.

As shown in FIG. 5, the rendering bundle 532 is a bundle for placing data of the unique attribute feature. The light mapping 514, normal or reflection mapping 516, shadow mapping 518, and material information 520 may be placed into the corresponding data blocks of the rendering bundle.

After the data portion of a unique attribute feature of a particular three-dimensional graph description object in the group of three-dimensional graph description objects is extracted, the data portion of the unique attribute feature of the particular three-dimensional graph description object may be placed according to different attributes into data blocks corresponding to respective attributes. For example, material information is placed into a data block corresponding to the material information.

In step S306, the data block is combined with other related data according to a preset format to form a unique data block set.

The other related data includes header information, version information, and a data block index.

In this example embodiment, the data block is combined with other related data according to a preset format to form a unique data block set; specifically, the data block corresponding to the unique attribute feature is combined with related management data such as header information, version information, and a data block index to form a data block set, which is also referred to as a rendering bundle in this example embodiment.

In step S308, the unique data block set is processed to form the separate description file.

This step is similar to step S208, and for the details, reference may be made to the related description in step S208.

In step S104, the shared description file is combined with any of the separate description files according to requirements for displaying the three-dimensional graph to form a complete three-dimensional graph description file.

After the shared description file and the separate description file are formed, the shared description file may be combined with the separate description file as required to form a complete three-dimensional graph description file. For example, a type of female bags in three colors, namely, red, yellow, and blue, will form a shared description file and three SKU separate description files. The separate description files include: a red female bag SKU description file, a yellow female bag SKU description file, and a blue female bag SKU description file. If the yellow female bag needs to be presented, the shared description file and the yellow SKU description file are combined to form a complete yellow female bag description file. If the blue female bag needs to be presented, the shared description file will be combined with the blue SKU description file to form a complete blue female package description file.

After the complete three-dimensional graph description file is formed, the three-dimensional graph may be generated according to the data describing the three-dimensional graph in the three-dimensional graph description file for presentation.

Specifically, the shared description file is formed for a group of three-dimensional graph description objects with common attribute features, and is respectively combined with a separate description file of each specific three-dimensional graph description object in the group to form a three-dimensional graph for each specific three-dimensional graph description object. The combining is processed according to a general process of the three-dimensional graph presentation rendering. The related content in the data block set such as the header information, the version information, and the data block index included in the shared description file and the separate description file may provide related information about implementation of the file combination.

So far, the implementation manner of the method for generating a three-dimensional graphic file provided in this example embodiment is described through the above steps S101-S104. As may be seen from the above description, the method for generating a three-dimensional graphic file provided in the present disclosure separates a data portion describing a unique attribute feature of each three-dimensional graph description object among the objects in the data portions of identical attribute features of a group of three-dimensional graph description objects including identical attribute features, and forms a shared description file and a separate description file for each three-dimensional graph description object respectively. If the method is applied to dynamic SKU presentation of e-commerce commodities, when different SKUs of the same kind of commodities are presented at a client terminal, the shared description file only needs to be obtained once. When each SKU commodity is presented, a different SKU separate description file only needs to be obtained each time, and then combine the separate description file with the data in the shared description file, thereby displaying a three-dimensional graph. The client terminal no longer needs to download complete three-dimensional data each time, so the redundant data access consumption is reduced, the user's traffic is saved, and no lag will be caused. Therefore, the presentation is smoother and the user experience is improved.

In order to illustrate the effect of the present disclosure more clearly, a method for presenting a three-dimensional graph at a client terminal is provided in a second example embodiment of the present disclosure. This method may be used in a three-dimensional SKU presentation scenario of commodities. Referring to FIG. 6, a flowchart of a method for presenting a three-dimensional graph at a client terminal according to an example embodiment of the present disclosure is shown. Detailed description is made in the following with reference to FIG. 6.

In step S602, a shared description file of a group of three-dimensional graph description objects including identical attribute features is downloaded, and at least one separate description file of the group of three-dimensional graph description objects is downloaded.

For example, the shared description file and the separate description file are obtained by: extracting, from data of a group of three-dimensional graph description objects including identical attribute features, data portions of the identical attribute features to form a shared description file shared by the group of three-dimensional graph description objects; and extracting a data portion of a unique attribute feature of each three-dimensional graph description object in the group of three-dimensional graph description objects to form a separate description file corresponding to each three-dimensional graph description object.

The downloading a shared description file of a group of three-dimensional graph description objects including identical attribute features, and downloading at least one separate description file of the group of three-dimensional graph description objects may refer to that the client terminal downloads the shared description file and the at least one separate description file from a server terminal storing the shared description file and the separate description file when the client terminal presents a three-dimensional graph.

For example, a group of three-dimensional graph description objects is a type of female bags that need to be presented by e-commerce, including three colors of red, yellow, and blue. The female bags are only different in colors, and are identical in materials, textures, and geometric shapes. A shared description file of data including the materials, textures, and geometric shapes of the female bags, and a red SKU separate description file, a yellow SKU separate description file, and a blue SKU separate description file are stored in a server terminal. When different SKUs of this type of female bags need to be presented dynamically, the shared description file and one or more separate description files of this type of female bags need to be downloaded to the client terminal firstly through this step.

In step S604, the shared description file is combined with the separate description file to form a complete three-dimensional graph description file.

After the client terminal downloads the shared description file and the separate description file of the three-dimensional graph description file, the shared description file needs to be combined with the separate description file to form a complete three-dimensional graph description file for presentation.

For example, in the example of step S602, if the female bag shared description file and the red SKU separate description file are downloaded, the shared description file and the red SKU separate description file are combined to form a complete red female bag three-dimensional graph description file.

In step S606, the three-dimensional graph is presented automatically by using the combined three-dimensional graph description file.

After a complete three-dimensional graph description file is formed, data in the three-dimensional graph description file is extracted, and the corresponding three-dimensional graph is presented on a display screen of the client terminal.

For example, the complete red female bag three-dimensional graph description file is formed in the step S604, and the three-dimensional graph of the red female bag is presented on the display screen of the client terminal in this step.

In step S608, other separate description files belonging to the group of three-dimensional graph description objects are further downloaded according to presentation requirements, and the process returns the step of combining the shared description file with the separate description file to form a complete three-dimensional graph description file until the three-dimensional graph presentation is exited.

When the presentation is not finished, other separate description files belonging to the group of three-dimensional graph description objects need to be further downloaded according to presentation requirements, and steps S604 and S606 are then performed for the downloaded separate description files. When the presentation is finished, the three-dimensional graph presentation is exited.

For example, in the example in step S606, the three-dimensional graph of the red female bag is presented on the display screen of the client terminal through step S606. The presentation requirement of the e-commerce is presenting the female bags in three colors in sequence. After step S606, it is necessary to download the yellow SKU separate description file and perform steps S604 and S606 to present the three-dimensional graph of the yellow female bag on the display screen of the client terminal, and finally download the blue SKU separate description file and perform steps S604 and S606 to present the three-dimensional graph of the blue female bag on the display screen of the client terminal. In this case, all the presentations are completed, and the three-dimensional graph presentation is exited. Certainly, the process of three-dimensional graph presentation is often ended according to an instruction of the client terminal. Therefore, it is unnecessary to download all the separate description files of a group of SKUs, thus saving data traffic.

For example, in order to reduce the downloading traffic of the client terminal, according to a commodity browsing record of the client terminal, the shared description file of the SPU presentation commodities frequently accessed by the client terminal is downloaded and stored in the client terminal locally. When the client terminal needs to present the commodities belonging to the SPU subsequently, the shared description file of the SPU commodities stored in the client terminal locally is directly combined with a separate description file of a specific SKU presentation commodity of the downloaded SPU to form the complete three-dimensional graph description file.

In order to introduce the method of the present disclosure more clearly, the application of the method of the present disclosure in an e-commerce sales platform is introduced below with reference to a specific e-commerce sales scenario.

By taking e-commerce sales of a type of female bags as an example, the type of female bags has identical shapes and sizes, i.e., geometric features, but has different colors and textures. The female bags in different colors and textures belong to different SKU presentation commodities of the same SPU. Assume that the color of the female bag is red, yellow, and blue; and the texture is a smooth surface or a furry surface. The server terminal needs to store a shared description file describing the geometric features of the female bag and a separate description file describing the color and the texture. The separate description file includes a red SKU separate description file, a yellow SKU separate description file, a blue SKU separate description file, a smooth texture SKU separate description file, and a furry texture SKU separate description file. When a user purchases a female bag through a mobile phone client terminal, the client terminal may dynamically present the commodities. If the presentation order is set as a red female bag with a smooth surface, a yellow female bag with a smooth surface, a blue female bag with a smooth surface, a red female bag with a furry surface, a yellow female bag with a furry surface, and a blue female bag with a furry surface, the presentation process is as follows: the client terminal first downloads a shared description file describing the geometric features of the female bag from the server terminal and stores it in the client terminal, downloads a red SKU separate description file and a smooth texture SKU separate description file, combines the above three files to form a complete three-dimensional graph description file of a red female bag with a smooth surface, and displays the red female bag with a smooth surface on a screen of the mobile phone. Since the shared description file has been stored to the client terminal, only the yellow SKU separate description file and the smooth texture SKU separate description file need to be downloaded at this point, the above two files are combined with the shared description file that has been downloaded to form a complete three-dimensional graph description file of a yellow female bag with a smooth surface, and the yellow female bag with a smooth surface is displayed on the screen of the mobile phone. Then, corresponding SKU separate description files are downloaded in sequence according to the presentation requirements, until the presentation ends.

Figure 7:
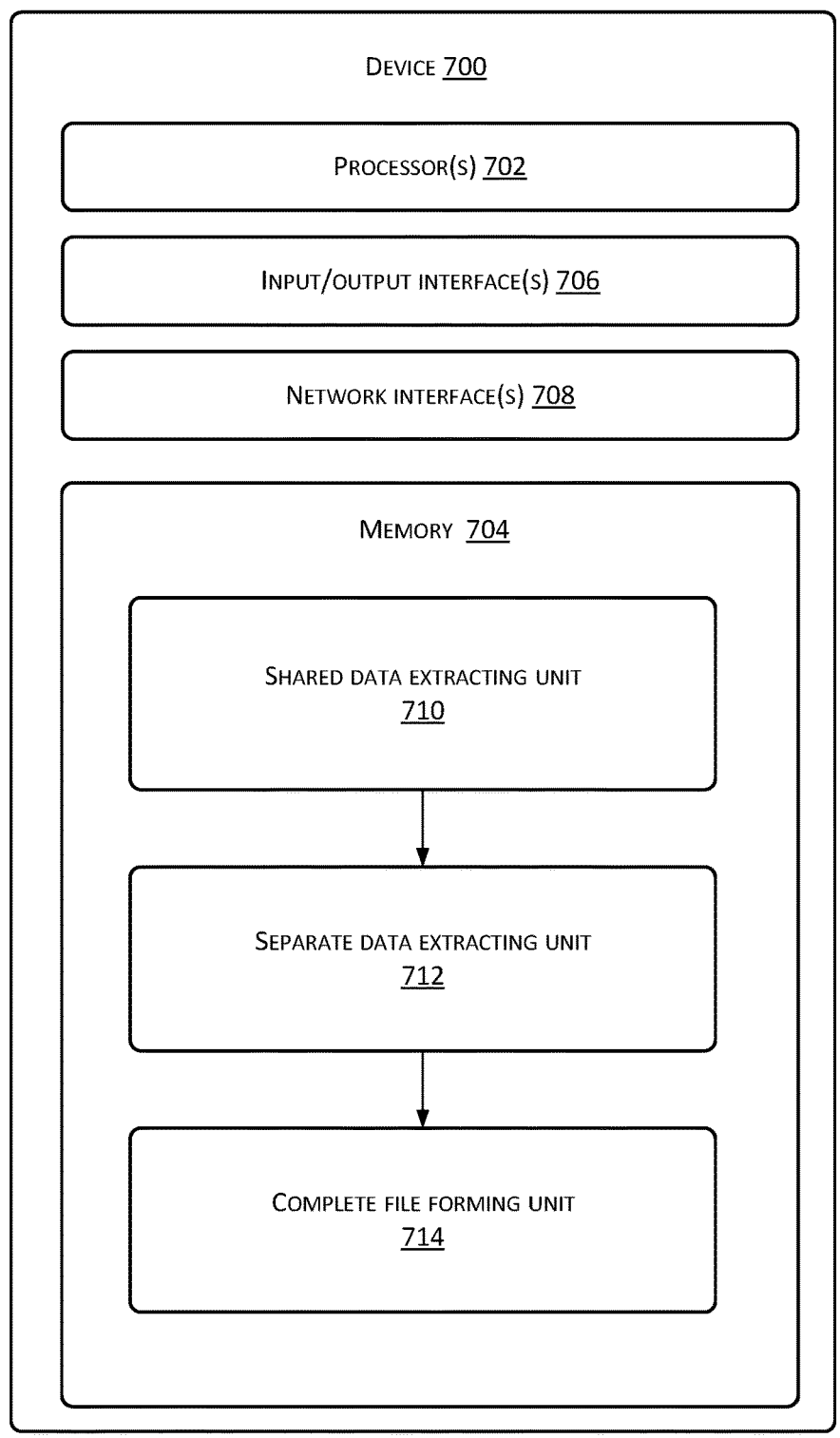
FIG. 7 is a schematic diagram of a device for generating a three-dimensional graphic file according to a third example embodiment of the present disclosure.

Corresponding to the above method for generating a three-dimensional graphic file, a device for generating a three-dimensional graphic file is further provided in the present disclosure. The device example embodiment is described in a relatively simple manner because it is basically similar to the method example embodiment, and for related parts, reference may be made to the parts described in the method example embodiment. The device example embodiment described in the following is just schematic. The example embodiment of the device for generating a three-dimensional graphic file is as follows:

Referring to FIG. 7, a schematic diagram of a device for generating a three-dimensional graphic file according to a third example embodiment of the present disclosure is shown.

The device 700 for generating a three-dimensional graphic file includes one or more processor(s) 702 or data processing circuit unit(s) and memory 704. The device 700 may further include one or more input/output interface(s) 706 and one or more network interface(s) 708. The memory 704 is an example of computer readable medium or media.

The memory 704 may store therein a plurality of modules or units including a shared data extracting unit 710, a separate data extracting unit 712, and a complete file forming unit 714.

The shared data extracting unit 710 is configured to extract, from data of a group of three-dimensional graph description objects including identical attribute features, data portions of the identical attribute features to form a shared description file shared by the group of three-dimensional graph description objects.

The unique data extracting unit 702 is configured to extract a data portion of a unique attribute feature of each three-dimensional graph description object in the group of three-dimensional graph description objects respectively to form a separate description file corresponding to each three-dimensional graph description.

The complete file forming unit 714 is configured to combine the shared description file with any of the separate description files according to requirements for displaying a three-dimensional graph to form a complete three-dimensional graph description file.

For example, the identical attribute features in the shared data extracting unit are geometric features of the three-dimensional graph description objects.

For example, the shared data extracting unit includes:
a data extraction sub-unit configured to extract, from data of a group of three-dimensional graph description objects including identical attribute features, data portions of the identical attribute features;
a data block placing sub-unit configured to place the data of identical attribute features according to attributes into one or more data blocks corresponding to the attributes;
a data block set forming sub-unit configured to combine the one or more data blocks corresponding to the attributes with other related data according to a preset format to form a common data block set; and
a shared description file forming sub-unit configured to file the common data block set to form the shared description file.

For example, the independent file extracting unit includes:
a data extraction sub-unit configured to extract a data portion of a unique attribute feature of a particular three-dimensional graph description object in the group of three-dimensional graph description objects, wherein the unique attribute feature includes one or more attribute features;
a data block placing sub-unit configured to place the data portion of the unique attribute feature of the particular three-dimensional graph description object according to different attributes into data blocks corresponding to respective attributes;
a unique data block set forming sub-unit configured to combine the data block with other related data according to a preset format to form a unique data block set; and
a separate description file forming sub-unit configured to file the unique data block set to form the separate description file.

For example, the other related data includes:
header information, version information, and a data block index.

For example, the processing includes:
compressing data in the common data block set or unique data block set.

For example, the shared data extracting unit and the unique data extracting unit further include:
an encryption and compression sub-unit configured to, after the common data block set or the unique data block set is processed and before the shared description file or the separate description file is formed, encrypt and/or compress intermediate files after the processing.

For example, when the group of three-dimensional graph description objects including identical attribute features has identical material data, the identical attribute features include materials of the three-dimensional graph description objects.

For example, the unique attribute features of the three-dimensional graph description objects include:

color, material, and texture.

Figure 8:
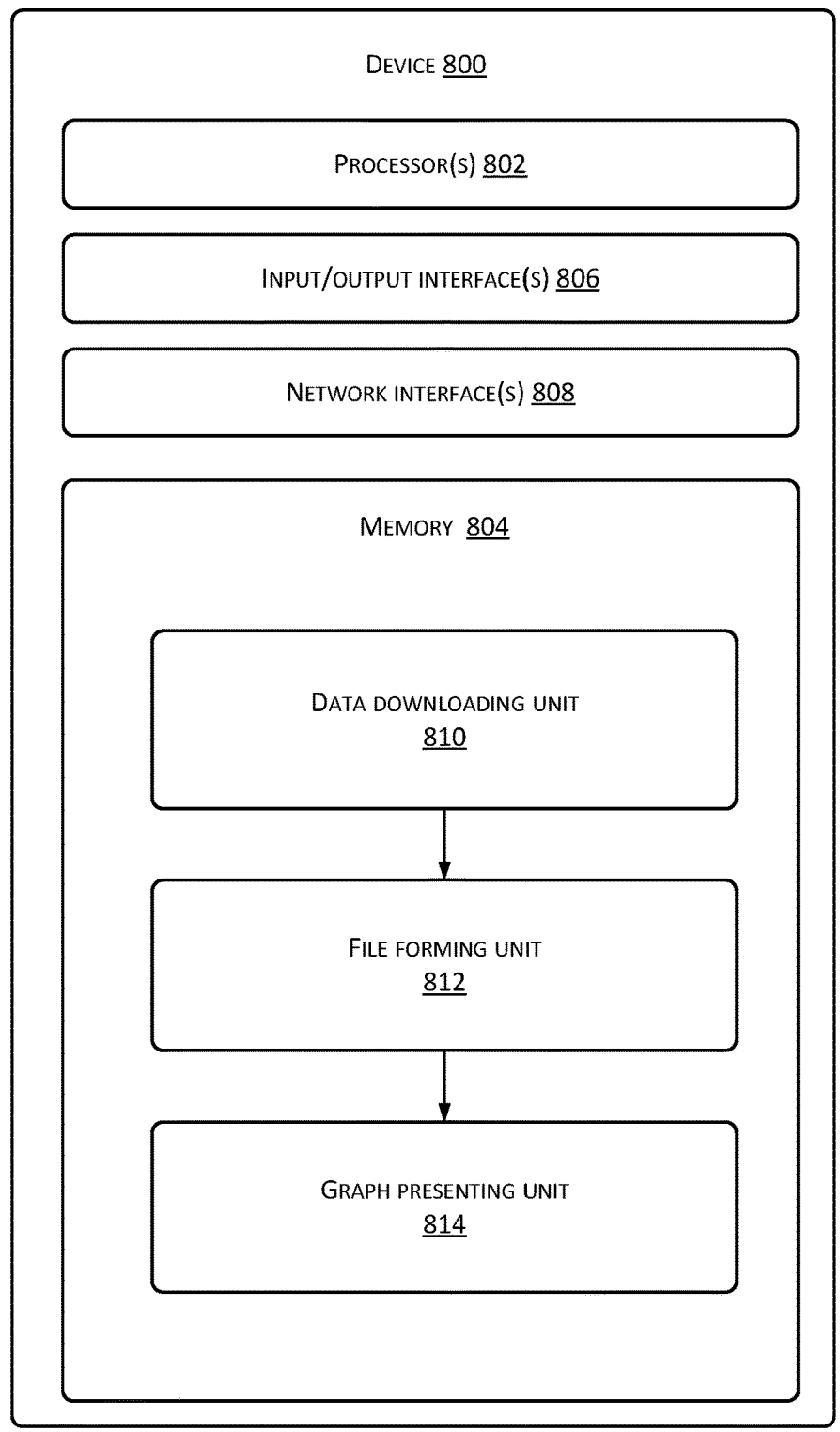
FIG. 8 is a schematic diagram of a device for presenting a three-dimensional graph at a client terminal according to a fourth example embodiment of the present disclosure.

Corresponding to the above method for presenting a three-dimensional graph at a client terminal, a device for presenting a three-dimensional graph at a client terminal is further provided in the present disclosure. The device example embodiment is described in a relatively simple manner because it is similar to the method example embodiment, and for related parts, reference may be made to the parts described in the method example embodiment. The device example embodiment described in the following is just schematic. The example embodiment of the device for presenting a three-dimensional graph at a client terminal is as follows:

Referring to FIG. 8, a schematic diagram of a device for generating a three-dimensional graph according to a fourth example embodiment of the present disclosure is shown.

The device 800 for presenting a three-dimensional graph at a client terminal includes one or more processor(s) 802 or data processing circuit unit(s) and memory 804. The device 800 may further include one or more input/output interface(s) 806 and one or more network interface(s) 808. The memory 804 is an example of computer readable medium or media.

The memory 804 may store therein a plurality of modules or units including a data downloading unit 810, a file forming unit 812, and a graph presenting unit 814.

The data downloading unit 810 is configured to download a shared description file of a group of three-dimensional graph description objects including identical attribute features, and download at least one separate description file of the group of three-dimensional graph description objects, wherein the shared description file and the separate description file are obtained by: extracting, from data of a group of three-dimensional graph description objects including identical attribute features, data portions of the identical attribute features to form a shared description file shared by the group of three-dimensional graph description objects; and extracting a data portion of a unique attribute feature of each three-dimensional graph description object in the group of three-dimensional graph description objects respectively to form a separate description file corresponding to each three-dimensional graph description object.

The file forming unit 812 is configured to combine the shared description file with the separate description file to form a complete three-dimensional graph description file.

The graph presenting unit 814 is configured to automatically present the three-dimensional graph by using the combined three-dimensional graph description file.

For example, the group of three-dimensional graph description objects including identical attribute features includes a group of different SKU presentation commodities belonging to the same SPU.

For example, the identical attribute features include:

geometric features of the different SKU presentation commodities.

For example, the unique attribute features include:

color, material, and texture of each SKU presentation commodity in the different SKU presentation commodities.

For example, the device further includes:

a file storing unit configured to, according to a commodity browsing record of the client terminal, download a shared description file of an SPU presentation commodity frequently accessed by the client terminal and store the shared description file in the client terminal locally; when the client terminal needs to present the presentation commodity belonging to the SPU subsequently, directly combine the shared description file of the SPU commodity stored in the client terminal locally with a separate description file of a specific SKU presentation commodity of the downloaded SPU to form the complete three-dimensional graph description file.

The present disclosure is disclosed by the above example embodiments, but they are not intended to limit the present disclosure. Any person skilled in the art may make possible variations and modifications without departing from the spirit and scope of the present disclosure. The protection scope of the present disclosure should subject to the scope defined in the claims of the present disclosure.

In a typical configuration, the computing device includes one or more central processing units (CPUs), an input/output interface, a network interface, and a memory.

The memory may include computer readable media such as a volatile memory, a Random-Access Memory (RAM), and/or a non-volatile memory, e.g., a Read-Only Memory (ROM) or a flash RAM. The memory is an example of a computer readable medium.

The computer readable medium includes non-volatile and volatile media as well as movable and non-movable media, and may implement information storage by means of any method or technology. The information may be a computer readable instruction, a data structure, and a module of a program or other data. An example of the storage medium of a computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this text, the computer readable medium does not include transitory media, such as a modulated data signal and a carrier.

Those skilled in the art should understand that the example embodiments of the present disclosure may be provided as a method, a system, or a computer program product. Therefore, the example embodiment of the present disclosure may be implemented in the form of a complete hardware example embodiment, a complete software example embodiment, or an example embodiment combining software and hardware. Moreover, the example embodiment of the present disclosure may be in the form of a computer program product implemented on one or more computer usable storage media (including, but are not limited to, a magnetic disk memory, a CD-ROM, an optical memory and the like) including computer usable program codes.

The present disclosure may further be understood with clauses as follows.

Clause 1. A method for generating a three-dimensional graphic file, the method comprising:

extracting, from data of a group of three-dimensional graph description objects including identical attribute features, data portions of the identical attribute features to form a shared description file shared by the group of three-dimensional graph description objects;

extracting a data portion of a unique attribute feature of each three-dimensional graph description object in the group of three-dimensional graph description objects respectively to form a separate description file corresponding to each three-dimensional graph description object; and combining the shared description file with any of the separate description files according to requirements for displaying a three-dimensional graph to form a complete three-dimensional graph description file, the three-dimensional graph description file being used to generate the three-dimensional graph.

Clause 2. The method of clause 1, wherein in the step of extracting, from the data of the group of three-dimensional graph description objects including the identical attribute features, the data portions of the identical attribute features to form the shared description file shared by the group of three-dimensional graph description objects, the identical attribute features are geometric features of the three-dimensional graph description objects.

Clause 3. The method of clause 1, wherein the extracting, from the data of the group of three-dimensional graph description objects including the identical attribute features, the data portions of the identical attribute features to form the shared description file shared by the group of three-dimensional graph description objects comprises:

extracting, from the data of the group of three-dimensional graph description objects including identical attribute features, data portions of the identical attribute features;

placing the data of identical attribute features according to attributes into one or more data blocks corresponding to the attributes;

combining the one or more data blocks corresponding to the attributes with other related data according to a preset format to form a common data block set; and processing the common data block set to form the shared description file.

Clause 4. The method of clause 1, wherein the extracting the data portion of the unique attribute feature of each three-dimensional graph description object in the group of three-dimensional graph description objects respectively to form the separate description file corresponding to each three-dimensional graph description object comprises:

extracting a data portion of a unique attribute feature of a particular three-dimensional graph description object in the group of three-dimensional graph description objects, the unique attribute feature including one or more attribute features;

placing the data portion of the unique attribute feature of the particular three-dimensional graph description object according to different attributes into data blocks corresponding to respective attributes;

combining the data blocks with other related data according to a preset format to form a unique data block set; and processing the unique data block set to form the separate description file.

Clause 5. The method of clause 3 or 4, wherein the other related data comprises:
 header information;
 version information; and
 a data block index.

Clause 6. The method of clause 3 or 4, wherein the processing comprises:
 compressing data in the common data block set or unique data block set.

Clause 7. The method of clause 3 or 4, wherein after the processing the common data block set or the unique data block set, and before the forming the shared description file or the separate description file, the method comprises:

encrypting and/or compressing an intermediate file after the processing.

Clause 8. The method of clause 1 or 2, wherein when the group of three-dimensional graph description objects including the identical attribute features have identical material data, the identical attribute features comprise materials of the three-dimensional graph description objects.

Clause 9. The method of clause 1, wherein the unique attribute features of the three-dimensional graph description objects comprise:
 color;
 material; and
 texture.

Clause 10. A device for generating a three-dimensional graphic file, the device comprising:

a shared data extracting unit configured to extract, from data of a group of three-dimensional graph description objects including identical attribute features, data portions of the identical attribute features to form a shared description file shared by the group of three-dimensional graph description objects;

a separate data extracting unit configured to extract a data portion of a unique attribute feature of each three-dimensional graph description object in the group of three-dimensional graph description objects respectively to form a separate description file corresponding to each three-dimensional graph description; and a complete file forming unit configured to combine the shared description file with any of the separate description files according to requirements for displaying a three-dimensional graph to form a complete three-dimensional graph description file, wherein the three-dimensional graph description file may be configured to generate the three-dimensional graph.

Clause 11. A method for presenting a three-dimensional graph at a client terminal, the method comprising:

downloading a shared description file of a group of three-dimensional graph description objects including identical attribute features, and downloading at least one separate description file of the group of three-dimensional graph description objects, wherein the shared description file and the separate description file are obtained by the following:

extracting, from data of a group of three-dimensional graph description objects including identical attribute features, data portions of the identical attribute features to form the shared description file shared by the group of three-dimensional graph description objects; and extracting a data portion of a unique attribute feature of each three-dimensional graph description object in the group of three-dimensional graph description objects respectively to form the separate description file corresponding to each three-dimensional graph description object;

combining the shared description file with the separate description file to form a complete three-dimensional graph description file;

automatically presenting the three-dimensional graph by using the combined three-dimensional graph description file; and further downloading another separate description file belonging to the group of three-dimensional graph description objects according to presentation requirements, and returning to the step of combining the shared description file with the separate description file to form a complete three-dimensional graph description file, until the three-dimensional graph presentation exits.

Clause 12. The method of clause 11, wherein the group of three-dimensional graph description objects including identical attribute features comprises a group of different stock keeping unit (SKU) presentation commodities belonging to the same Standard Product Unit (SPU).

Clause 13. The method of clause 12, wherein the identical attribute features comprise:
geometric features of the different SKU presentation commodities.

Clause 14. The method of clause 12, wherein the unique attribute features comprise:
color, material, and texture of each SKU presentation commodity in the different SKU presentation commodities.

Clause 15. The method of clause 11, further comprising:
according to a commodity browsing record of the client terminal, downloading the shared description file of an SPU presentation commodity frequently accessed by the client terminal and storing the shared description file of the SPU presentation commodity locally;
when the client terminal is to present the presentation commodity belonging to the SPU subsequently, combining the shared description file of the SPU commodity stored in the client terminal locally directly with the separate description file of a specific SKU presentation commodity of the downloaded SPU to form the complete three-dimensional graph description file.

Clause 16. A device for presenting a three-dimensional graph at a client terminal, the device comprising:
a data downloading unit configured to download a shared description file of a group of three-dimensional graph description objects including identical attribute features, and download at least one separate description file of the group of three-dimensional graph description objects, wherein the shared description file and the separate description file are obtained by: extracting, from data of a group of three-dimensional graph description objects including identical attribute features, data portions of the identical attribute features to form the shared description file shared by the group of three-dimensional graph description objects; and extracting a data portion of a unique attribute feature of each three-dimensional graph description object in the group of three-dimensional graph description objects respectively to form the separate description file corresponding to each three-dimensional graph description object;
a file forming unit configured to combine the shared description file with the separate description file to form a complete three-dimensional graph description file; and
a graph presenting unit configured to automatically present the three-dimensional graph by using the combined three-dimensional graph description file.

What is claimed is:

1. A method comprising:
downloading a shared description file of a group of three-dimensional graph description objects including identical attribute features and a group of different stock keeping unit (SKU) presentation commodities belonging to a same Standard Product Unit (SPU);
storing the shared description file locally according to a commodity browsing record of a client terminal;
downloading at least one separate description file of the group of three-dimensional graph description objects;
combining the shared description file with a separate description file from the at least one separate description file to form a three-dimensional graph description file, wherein combining the shared description file with the separate description file comprises combining the shared description file stored in the client terminal locally with a downloaded separate description file of a specific SKU presentation commodity to form the three-dimensional graph description file; and
automatically presenting a three-dimensional graph by using the combined three-dimensional graph description file.

2. The method of claim 1, further comprising repeatedly performing combining the shared description file with another separate description file from the at least one separate description file to form another three-dimensional graph description file until presenting the three-dimensional graph is ended.

3. The method of claim 1, wherein data portions of the identical attribute features are extracted from data of the group of three-dimensional graph description objects to form the shared description file shared by the group of three-dimensional graph description objects.

4. The method of claim 1, wherein data portions of a unique attribute feature of at least one separate three-dimensional graph description object is extracted to form the at least one separate description file.

5. The method of claim 4, wherein the unique attribute feature comprises a unique color of a respective SKU presentation commodity in the different SKU presentation commodities.

6. The method of claim 4, wherein the unique attribute feature comprises a unique material of a respective SKU presentation commodity in the different SKU presentation commodities.

7. The method of claim 4, wherein the unique attribute feature comprises a unique texture of a respective SKU presentation commodity in the different SKU presentation commodities.

8. The method of claim 1, wherein the identical attribute features comprise: a geometric feature of the different SKU presentation commodities.

9. A device comprising:
one or more processors; and
one or more memories storing computer readable instructions that, executable by the one or more processors, cause the one or more processors to perform acts comprising:
downloading a shared description file of a group of three-dimensional graph description objects including one or more identical attribute features and a group of different stock keeping unit (SKU) presentation commodities belonging to a same Standard Product Unit (SPU);
storing the shared description file locally according to a commodity browsing record of a client terminal;
downloading a respective separate description file of a respective three-dimensional graph description object of the group of three-dimensional graph description objects;
combining the shared description file with the respective separate description file to form a three-dimensional graph description file, wherein combining the shared description file with the respective separate description file comprises combining the shared description file stored in the client terminal locally with a downloaded separate description file of a specific SKU presentation commodity to form the three-dimensional graph description file; and
automatically presenting a three-dimensional graph by using the combined three-dimensional graph description file.

10. The device of claim 9, wherein the acts further comprise repeating:
downloading another respective separate description file belonging to another respective three-dimensional graph description object of the group of three-dimensional graph description objects according to a presentation requirement, and combining the shared description file with the another respective separate description file to form another three-dimensional graph description file, until exiting a three-dimensional graph presentation.

11. The device of claim 9, wherein:

data portions of the identical attribute features are extracted from data of the group of three-dimensional graph description objects to form the shared description file shared by the group of three-dimensional graph description objects; and data portions of a unique attribute feature of the respective three-dimensional graph description object is extracted to form the respective separate description file.

12. The device of claim 11, wherein the unique attribute feature comprises:

a color, a material, and a texture of a respective SKU presentation commodity in the different SKU presentation commodities.

13. The device of claim 9, wherein the identical attribute features comprise: a geometric feature of the different SKU presentation commodities.

14. One or more memories storing computer readable instructions that, executable by one or more processors, cause the one or more processors to perform acts comprising:

downloading a shared description file of a group of three-dimensional graph description objects including identical attribute features and a group of different stock keeping unit (SKU) presentation commodities belonging to a same Standard Product Unit (SPU);

storing the shared description file locally according to a commodity browsing record of a client terminal;

downloading at least one separate description file of the group of three-dimensional graph description objects;

combining the shared description file with a separate description file from the at least one separate description file to form a three-dimensional graph description file, wherein combining the shared description file with the separate description file comprises combining the shared description file stored in the client terminal locally with a downloaded separate description file of a specific SKU presentation commodity to form the three-dimensional graph description file; and automatically presenting a three-dimensional graph by using the combined three-dimensional graph description file.

* * * * *